(12) United States Patent
Martinez et al.

(10) Patent No.: US 7,519,576 B2
(45) Date of Patent: Apr. 14, 2009

(54) INTEGRATED USER INTERFACE MECHANISM FOR RECURSIVE SEARCHING AND SELECTING OF ITEMS

(75) Inventors: Anthony Edward Martinez, Spicewood, TX (US); Michael D. Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1673 days.

(21) Appl. No.: 09/951,958

(22) Filed: Sep. 13, 2001

(65) Prior Publication Data

US 2003/0050773 A1 Mar. 13, 2003

(51) Int. Cl.
G06F 17/30 (2006.01)

(52) U.S. Cl. .................. 707/3; 707/1; 707/5; 707/6
(58) Field of Classification Search .............. 707/3, 707/1, 5, 6
See application file for complete search history.

(56) References Cited

U.S. PATENT DOCUMENTS

| | | | |
|---|---|---|---|
| 5,164,904 A | 11/1992 | Summer | 364/436 |
| 5,396,429 A | 3/1995 | Hanchett | 364/436 |
| 5,535,120 A * | 7/1996 | Chong et al. | 704/3 |
| 5,649,221 A | 7/1997 | Crawford et al. | |
| 5,835,881 A | 11/1998 | Trovato et al. | 701/211 |
| 5,983,161 A | 11/1999 | Lemelson et al. | 701/301 |
| 6,044,365 A | 3/2000 | Cannon et al. | |

(Continued)

OTHER PUBLICATIONS

"Merriam-Webster OnLine" 2000 by Merriam-Webster, Incorporated Merriam-Webster privacy Policy (http://web.archive.org/web/20001203191300/http://m-w.com/home.htm).*

(Continued)

*Primary Examiner*—Don Wong
*Assistant Examiner*—Thanh-Ha Dang
(74) *Attorney, Agent, or Firm*—Stephen J. Walder, Jr.; David A. Mims, Jr.

(57) ABSTRACT

The present invention is a graphical user interface and method of operation for searching, and selecting items from, a database. The invention provides a convenient mechanism to thoroughly search a database for useful items. The invention runs in the background, dynamically annotating the active part of a main application's user interface with an indicator, to show a user of a main application that useful items may be available in a database. The trigger for initially activating the mechanism for searching and selecting in a main application is the same as the trigger for activating another round of searching the database, thus minimizing the diversion of a user's attention away from the main application. A user may select an item from the database for use in the main application. This might involve inserting a word into text with a word processor; the items may be words, and the database may be a thesaurus or dictionary, for example. Other examples are utilizing an image with a graphics application, or placing an order to buy an item with a purchasing application. One aspect of the present invention is a method for searching, and selecting items from, a database. Another aspect of the present invention is a system for executing the method of the present invention. A third aspect of the present invention is as a set of instructions on a computer-usable medium, or resident in a computer system, for executing the method of the present invention.

37 Claims, 10 Drawing Sheets

U.S. PATENT DOCUMENTS

| | | | | |
|---|---|---|---|---|
| 6,111,523 | A | 8/2000 | Mee | 340/937 |
| 6,209,006 | B1 | 3/2001 | Medl et al. | |
| 6,226,792 | B1 * | 5/2001 | Goiffon et al. | 717/120 |
| 6,233,571 | B1 | 5/2001 | Egger et al. | |
| 6,389,434 | B1 * | 5/2002 | Rivette et al. | 715/512 |
| 6,542,882 | B1 * | 4/2003 | Smith | 706/46 |
| 6,662,152 | B2 * | 12/2003 | Sako et al. | 704/9 |
| 6,725,214 | B2 * | 4/2004 | Garcia-Chiesa | 707/3 |
| 6,848,029 | B2 * | 1/2005 | Coldewey | 711/137 |

OTHER PUBLICATIONS

"A Thesaurus in Three Dimensions" of Plumb Design demonstrates Thinkmap Software with Visual Thesaurus (www.plumbdesign.com/thesaurus) Press Releases, New York, Feb. 2, 1998 (http://www.thinkmap.com/pressrelease.jsp?id=66).*

"Xrefer" (http://www.xreferplus.com/research/index.jsp).*

(http://www.thinkmap.com/pressrelease.jsp?id=1169).*

Corel Corporation Limited, "Thesaurus," *Corel WordPerfect User Manual v6.1*, 1996, first printing, pp. 621-622.

Corel Corporation Limited, "Using Prompt-As-You-Go," Help Files for WordPerfect Office 2000, Standard Edition, 2000.

Corel Corporation Limited, "Using Spell-As-You-Go, Grammar-As-You-Go, Prompt-As-You-Go, and Quick Correct," *WordPerfect Office 2000 for Linux User Guide*, 2000, pp. 34-35.

Microsoft Corporation, "Look up Words in the Thesaurus," Help Files for Microsoft Office 2000, 2000.

* cited by examiner

INTEGRATED USER INTERFACE MECHANISM FOR RECURSIVE SEARCHING AND SELECTING OF ITEMS

FIELD OF THE INVENTION

The present invention relates in general to methods and systems for information handling, and in particular to a graphical user interface and method of operation for searching, and selecting items from, a database.

BACKGROUND OF THE INVENTION

Many approaches have been proposed to retrieving information and displaying it to a computer user. Examples include U.S. Pat. No. 6,209,006 (Medl, et al., Mar. 27, 2001), which relates to the use of hyperlinks that enable recall of help functions. "Elements of a user interface for an application program are predefined as help functions by the programmer or developer. . . . Upon selection of a highlighted hyperlinked element, a help window appears providing definitions, functional instructions, etc." Another example is U.S. Pat. No. 6,233,571 (Egger, et al., May 15, 2001), which relates to computerized research tools for locating legal opinions, patents and related documents, and how relationships among such documents may be detected and displayed. Another example is U.S. Pat. No. 5,649,221 (Crawford, et al., Jul. 15, 1997), which discloses a "reverse electronic dictionary;" the user enters one or more search words which are thought to exist in the definition of the word that is sought. Another example is U.S. Pat. No. 6,044,365 (Cannon, et al., Mar. 28, 2000), which relates to indexing and retrieving images, sounds, and text, used in greeting cards, invitations, announcement cards, and the like; a user inputs key words describing graphic and sound files to be retrieved.

However, the above-mentioned examples address substantially different problems, and thus are significantly different from the present invention.

In the past, thesaurus functions have been added to word processor applications. One example is Microsoft's WORD, in which a user may look up words in a thesaurus. A user may find the thesaurus function through menus at the top of the screen, or a user may find the thesaurus function by pointing to a word in the text, clicking the right mouse button, and then selecting a "synonyms" option.

Another example is Corel's WORDPERFECT; again, a user may find the thesaurus function in a menu at the top of the screen. Corel's WORDPERFECT also contains a feature called "Prompt-As-You-Go." Depending on the position of the insertion point on the screen, a suggested correction may be displayed in a small box at the top of the screen; or a correctly spelled word in the text may be echoed in the small box at the top of the screen, and a user may activate a drop-down list of synonyms at the top of the screen. However, this list does not allow further access to words beyond those in the list.

The above-mentioned thesaurus examples involve a significant diversion of a user's attention away from the main application. The activation trigger is at the top of the screen. The process for looking up words in the thesaurus is different from the thesaurus-activation process in the word processor; this causes an unnecessary distraction for the user. The above-mentioned thesaurus examples lack visual cues in the active part of the screen, to invite a user to take advantage of the thesaurus function.

Thus there is a need for systems and methods that allow a user to thoroughly search a database for items to utilize in a main application, while minimizing the diversion of a user's attention away from the main application. There is also a need for an effective visual cue, to show a user of a main application that useful items may be available in a database.

SUMMARY OF THE INVENTION

Typically, some effort is required to thoroughly search a database for useful items; the invention provides a convenient mechanism to do this. To give a general example, the invention involves providing a user of a main application with a recursive search process as follows: a) responsive to a cursor's position, identifying a target item; b) searching a database for items similar to said target item; c) providing an indicator, near said target item's position, to show the existence of similar items in said database; and d) providing access to the similar items. Access is conveniently provided through a pop-up window, near the target item's position. Any one of said similar items may then become a target item for the recursive search process, allowing a user to thoroughly search a database. The same process is applied to items in the main application and to items in the pop-up window, minimizing the diversion of a user's attention away from the main application. A user may select a similar item from the database for use in the main application.

The invention runs in the background, dynamically annotating the active part of a main application's user interface with an indicator, to show a user of a main application that useful items may be available in a database. The trigger for initially activating the mechanism for searching and selecting in a main application is the same as the trigger for activating another round of searching the database, thus minimizing the diversion of a user's attention away from the main application.

To give a more detailed example, one might employ the invention by applying a recursive annotation function to items in a main application, as follows: responsive to a cursor's position, identifying a target item; searching a database for items similar to said target item; providing an indicator, near the target item's position, to show that similar items from said database may be displayed; and providing, near the target item's position, an icon for sending a command for display to a recursive pop-up display function. The pop-up display function displays the similar items in a pop-up window, near the target item's position. Any one of the similar items in the pop-up window may become a target item for the above-mentioned recursive annotation function. A user may select a similar item from the database for use in the main application. This might involve inserting a word into text with a word processor; the items may be words, and the database may be a thesaurus or dictionary, for example. Other examples are utilizing an image with a graphics application, or placing an order to buy an item with a purchasing application.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers and may involve the use of a network. The present invention is not limited as to the type of computer on which it runs, and not limited as to the type of network used.

The following are definitions of terms used in the description of the present invention and in the claims:

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Item" means a word, image, text file, graphics file, or some other unit of data that may be stored in a database or used by software.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

Figure 1:
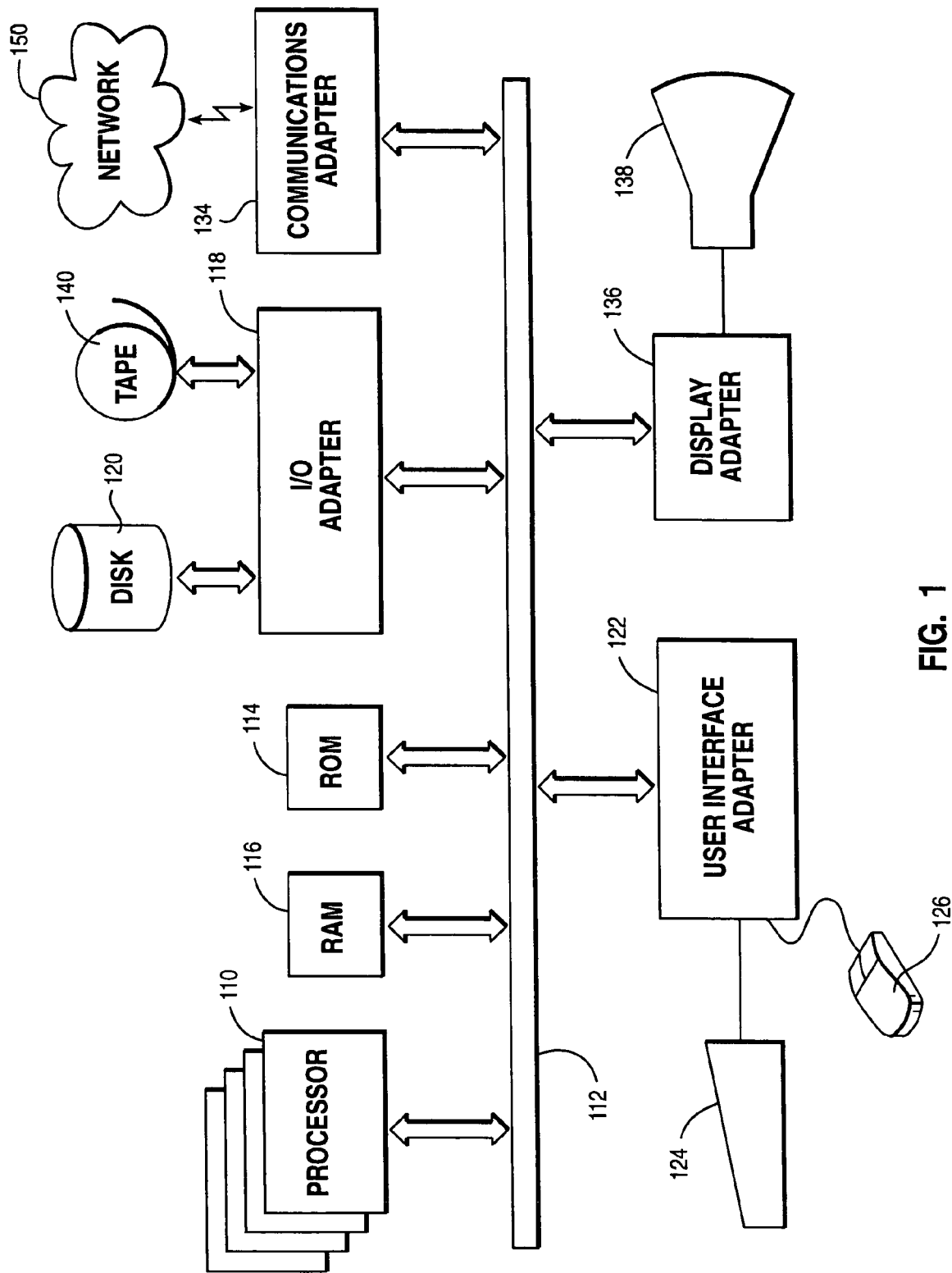
FIG. 1 illustrates a simplified example of an information handling system that may be used to practice the present invention.

FIG. 1 illustrates a simplified example of an information handling system that may be used to practice the present invention. The invention may be implemented on a variety of hardware platforms, including handheld computers, personal computers, workstations, servers, and embedded systems. The computer system of FIG. 1 has at least one processor 110.

Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112, user interface adapter 122 for connecting keyboard 124, mouse 126 or other user interface devices to bus 112, communication adapter 134 for connecting the information handling system to a data processing network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as Intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
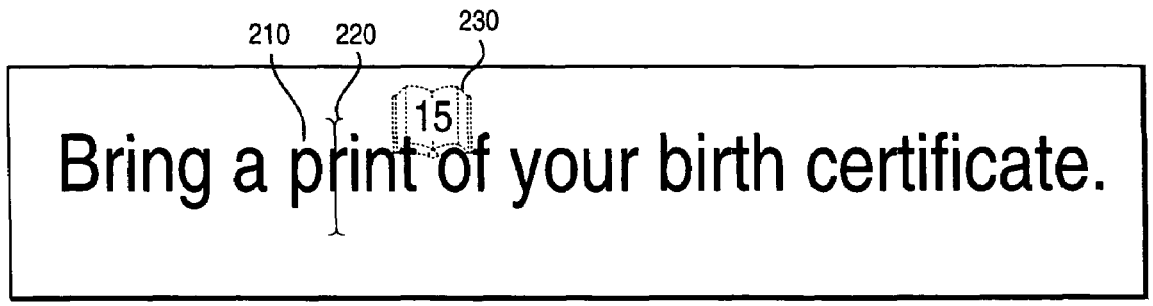
FIG. 2 illustrates one possible user interface display annotated with an indicator, according to the teachings of the present invention.

FIG. 2 illustrates one possible user interface display annotated with an indicator, according to the teachings of the present invention. Cursor 220 is positioned at the word "print," 210, in a line of text. This represents a line of text displayed by a main application such as a word processor or text editor. Responsive to the cursor 220's position, the invention identifies the word "print," 210, as a target item. The invention searches a database for items similar to the target item, and provides an indicator, 230, near word 210's position, to show the existence of similar items in said database. In this example, indicator 230 displays a number (15), showing how many of said similar items exist in said database. In this example, indicator 230 appears as a superscript number superimposed over a small translucent book icon.

Figure 3:
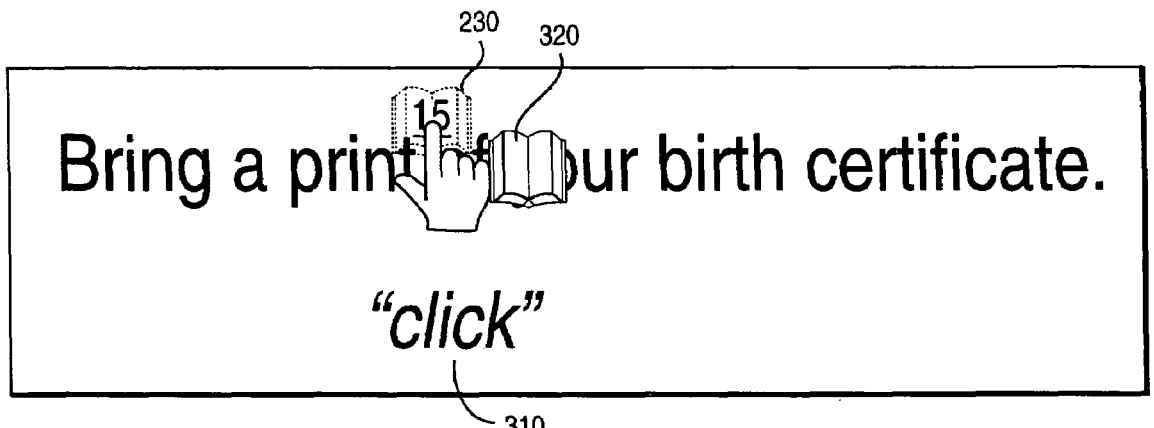
FIG. 3 illustrates further details of one possible user interface display annotated with an indicator, according to the teachings of the present invention.

FIG. 3 illustrates further details of one possible user interface display annotated with an indicator, according to the teachings of the present invention. Here, indicator 230 includes a function as an icon for sending a command for access or display. In this example, providing an indicator further comprises changing the appearance of said cursor, 320. In this example, cursor 320 appears as a hand with a book, reinforcing for the user the availability of similar items in said database. The notation "click," 310, signifies a user sending a command for access or display, by clicking a mouse button, or touching a touch-sensitive screen with a stylus, or using some other input device.

Figure 4:
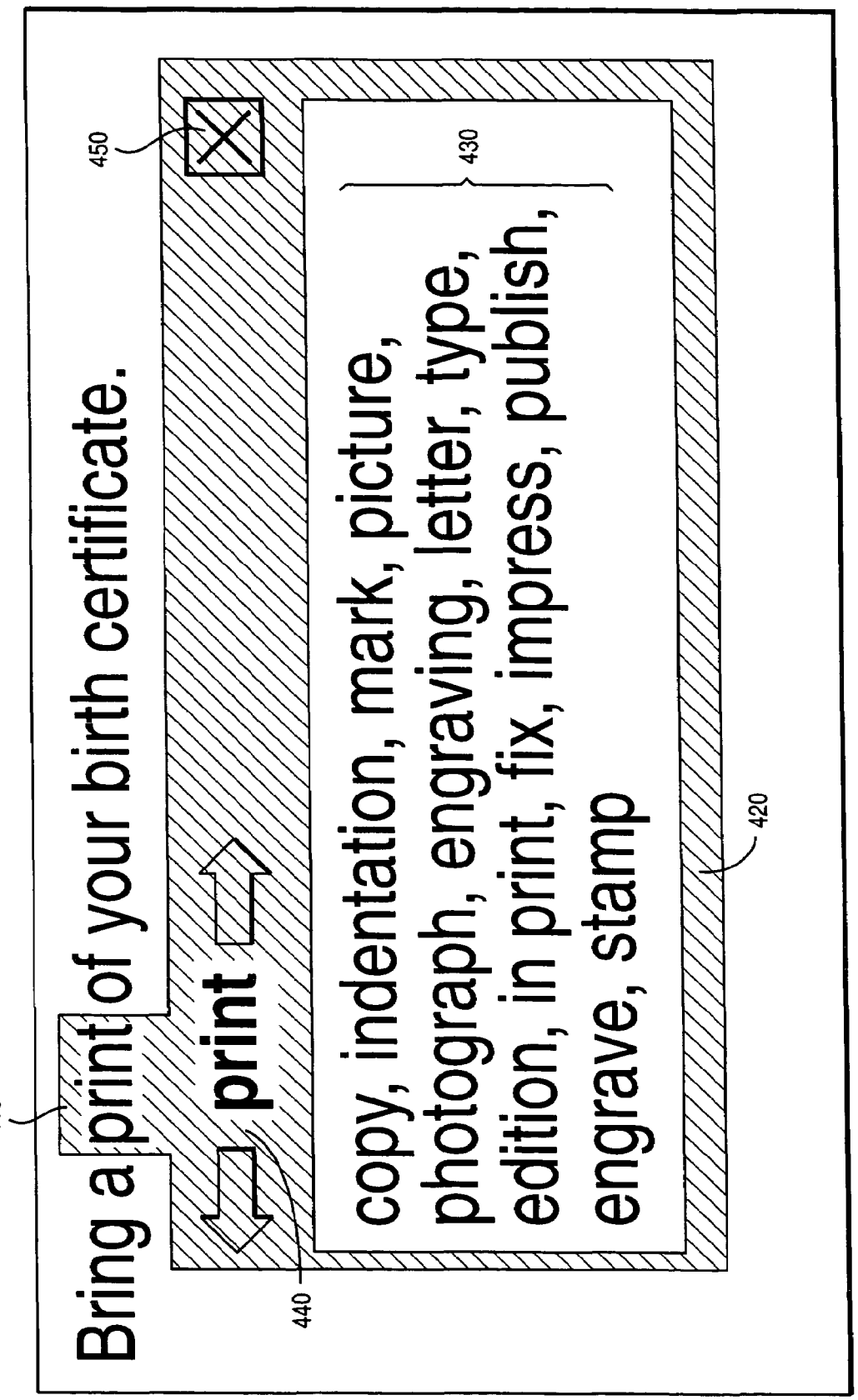
FIG. 4 illustrates further details of one possible user interface display annotated with a pop-up display, according to the teachings of the present invention.

FIG. 4 illustrates further details of one possible user interface display annotated with a pop-up display, according to the teachings of the present invention. Responsive to said command for display, the invention displays similar items, at 430, in a pop-up window 420. The target item is highlighted, 410. A pop-up display, 420, shows similar items, 430, and provides access to said similar items 430. Any one of the similar items at 430 may become a target item for the invention's recursive search process. Path 440 shows a history of target items. Button 450 provides a way to exit the pop-up display. Pop-up window 420 appears near target item 410, as displayed by a main application, minimizing the diversion of a user's attention away from the main application.

FIG. 4 also illustrates another feature of the invention: dynamically analyzing the context in which a first item (e.g. the item at 410) appears, and based on said context, displaying similar items so that the similar items displayed first are those most appropriate to replace the first item. In this example, the word "print" at 410 has been identified as a noun, so similar nouns are listed first among similar items at 430.

Figure 5:
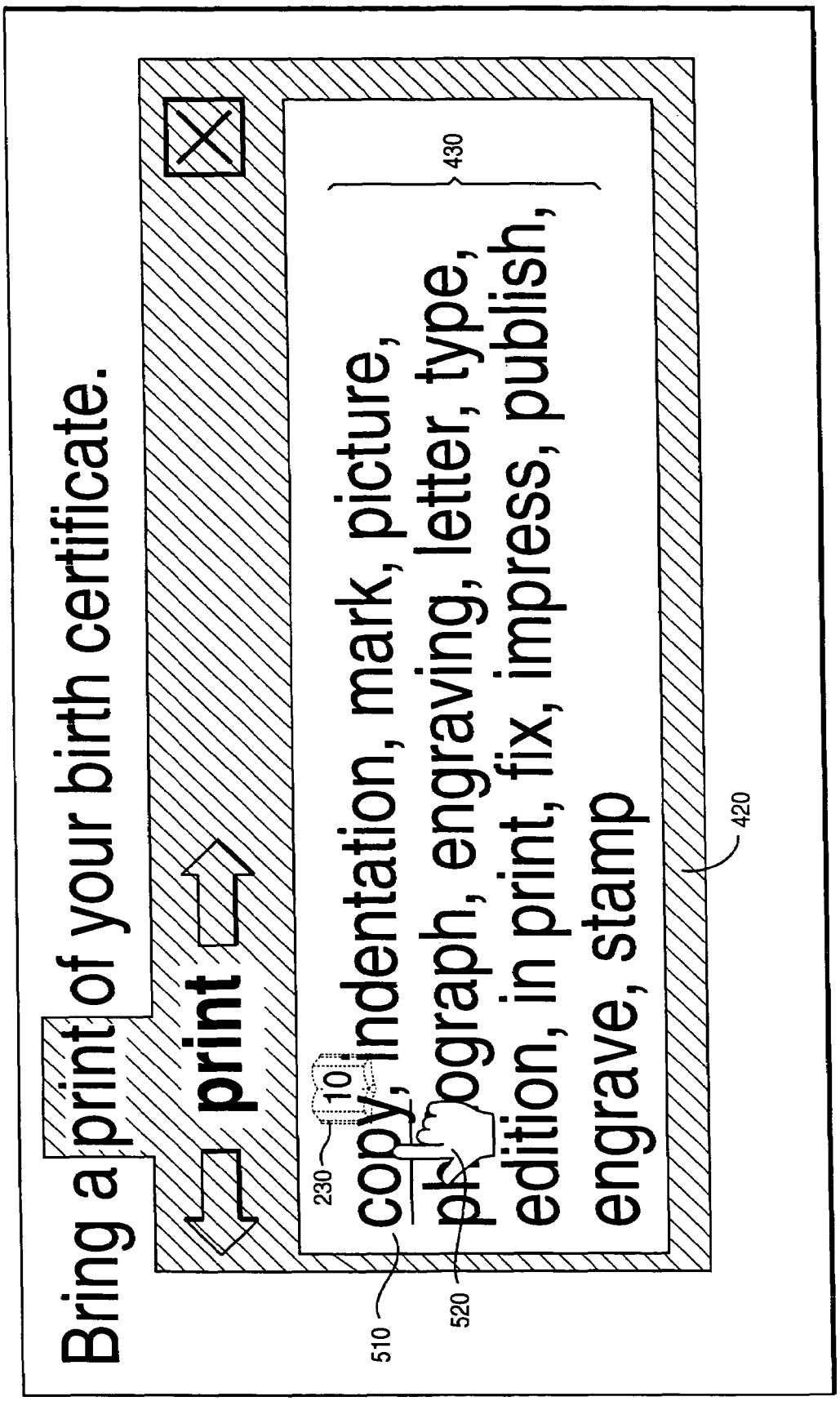
FIG. 5 illustrates one possible user interface display involving the invention's recursive search process.

FIG. 5 illustrates one possible user interface display involving the invention's recursive search process. FIG. 5 illustrates how any one of the similar items at 430 may become a target item for the invention's recursive search process. For example, the invention may apply a recursive annotation function to the similar items at 430; any one of said similar items at 430 may become a target item for said recursive annotation function. In this example, near cursor 520's position, the item at 510, the word "copy," has become a target item for said recursive annotation function. The invention searches a database for items similar to the target item. As in FIG. 2, the invention provides an indicator, 230, near word 510's position, to show the existence of similar items in the database. In this example, as in FIG. 2, indicator 230 displays a number (10), showing how many similar items (i.e. items similar to the item at 510) exist in said database. Thus the user may interact with the similar items 430 displayed in the pop-up window 420, in the same way as the user interacts with items displayed in the main application, such as item 220 in FIG. 2. The user may choose to see items similar to the item at 510. On the other hand, the user may choose to utilize the item at 510. In this example, the item at 510, the word "copy," is underlined to show that it may be selected by the user, and utilized in the main application.

Figure 6:
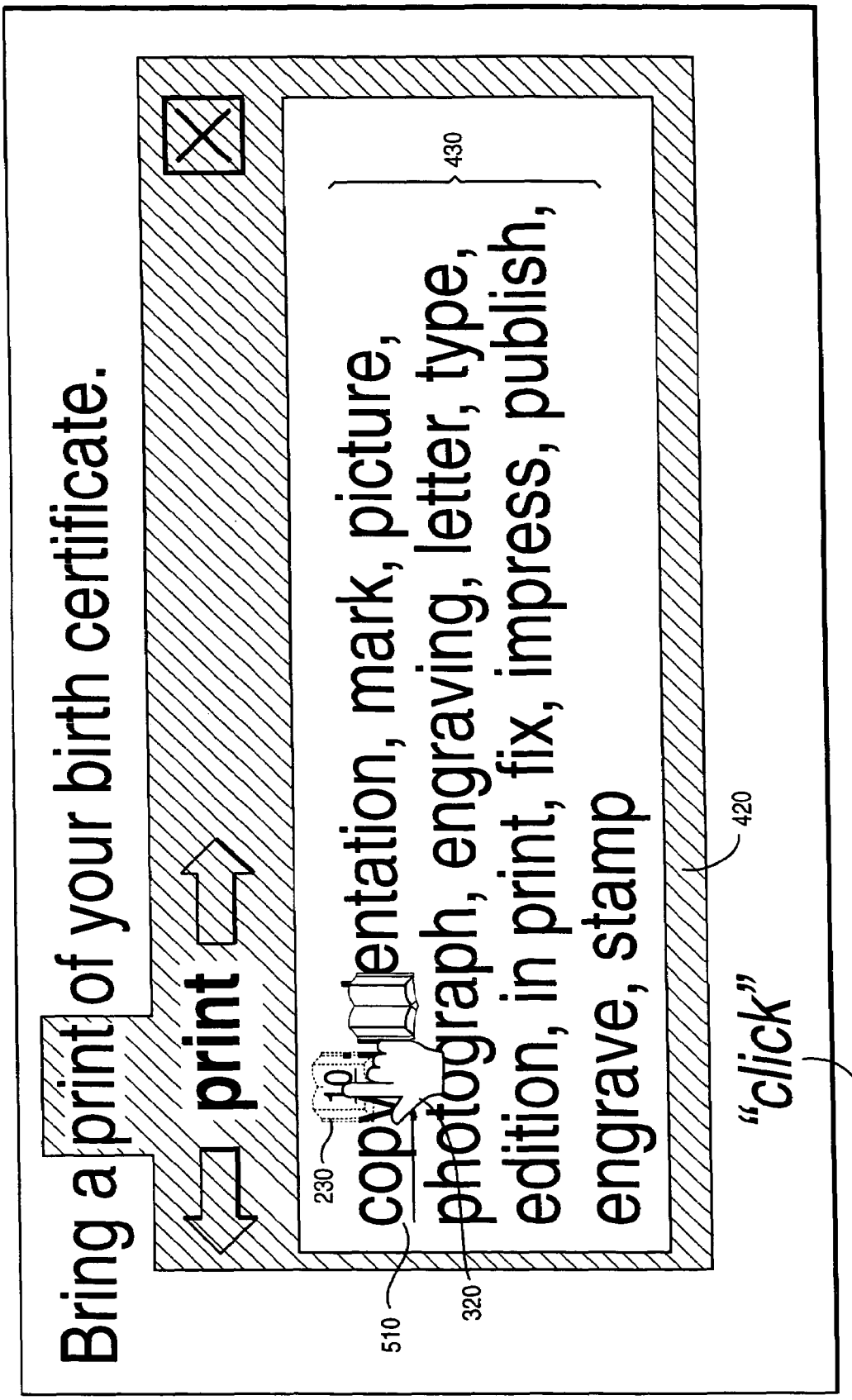
FIG. 6 illustrates further details of one possible user interface display involving the invention's recursive search process.

FIG. 6 illustrates an example of a user interface involving the invention's recursive search process. In the same manner as in FIG. 3, indicator 230 includes a function as an icon for sending a command for access or display. As in FIG. 3, providing an indicator (of similar items) further comprises changing the appearance of the cursor, 320. The notation "click," 310, signifies a user sending a command for access or display, by clicking a mouse button, or touching a touch-sensitive screen with a stylus, or using some other input device. Here, the user sends the command for display regarding item 510, one of the similar items displayed at 430 within pop-up window 420.

Figure 7:
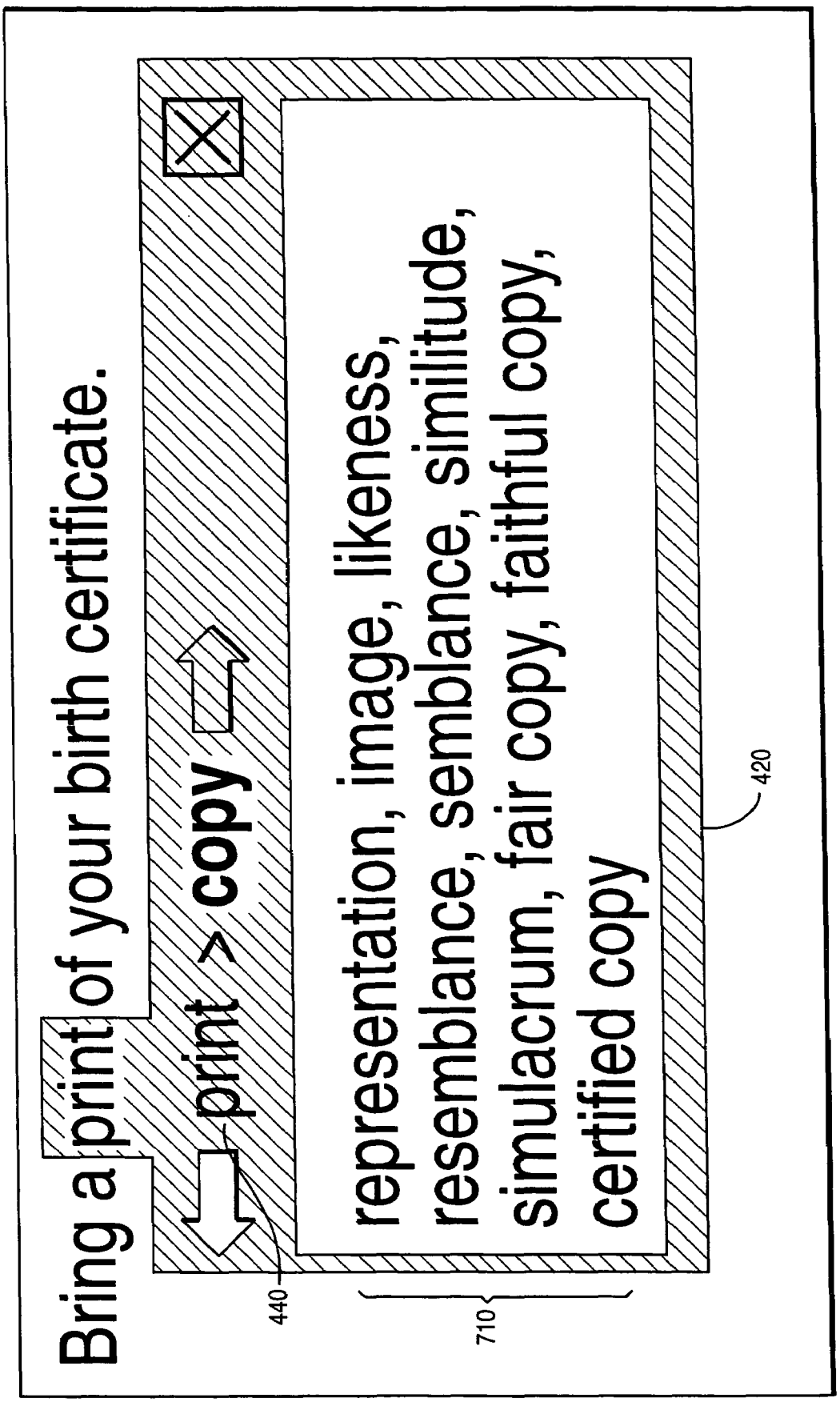
FIG. 7 illustrates one possible user interface display involving the invention's recursive search process, and a second round of searching.

FIG. 7 illustrates one possible user interface display involving the invention's recursive search process, and a second round of searching. The example in FIG. 7 shows that the invention, responsive to said command for display, displays similar items (this time, items similar to the word "copy"), at 710, in pop-up window 420. Path 440, with backward and forward arrow buttons, shows a history of target items, updated to include the word "copy."

Figure 8:
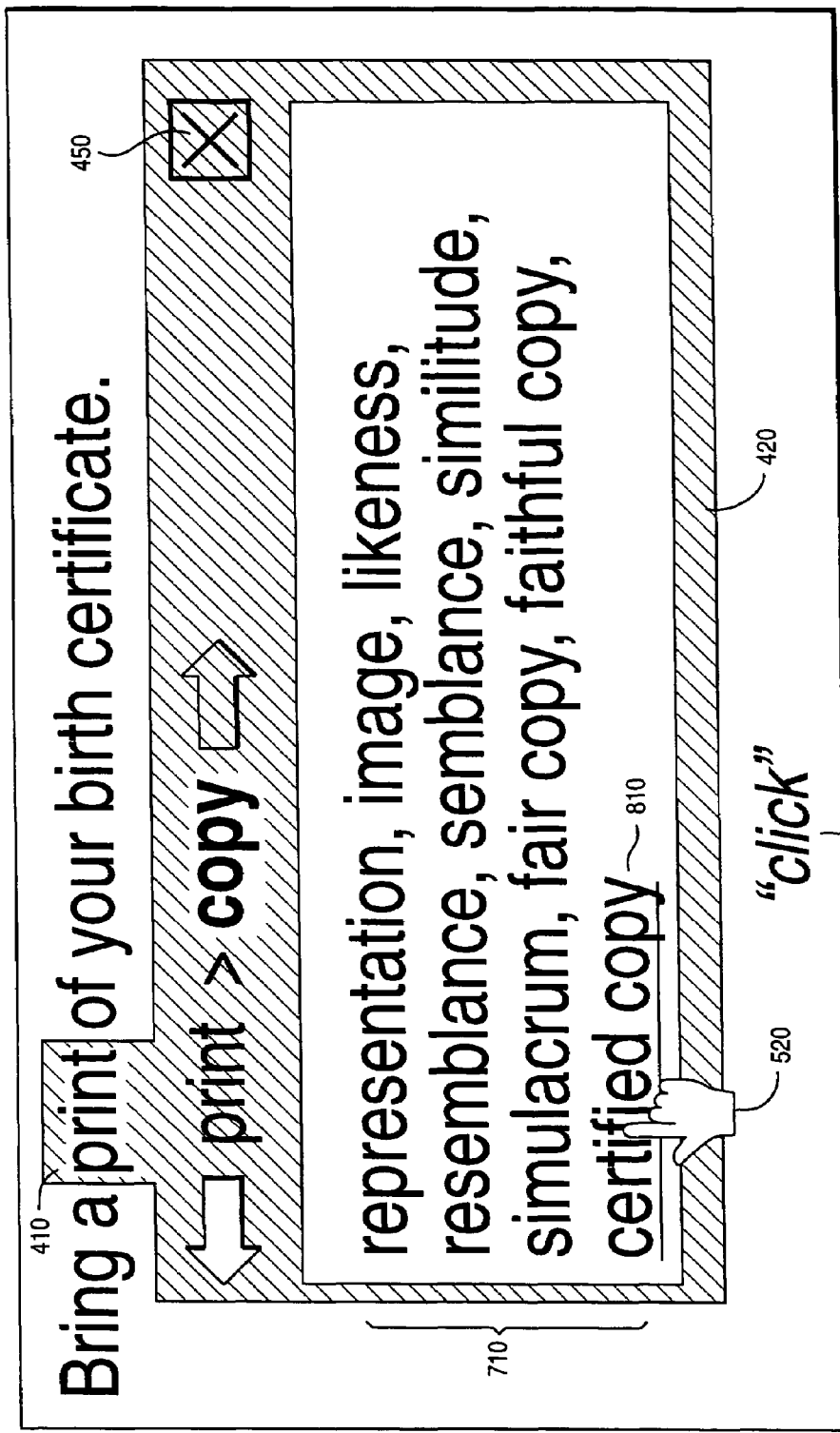
FIG. 8 illustrates one possible user interface display involving an example of the invention's selection process.

FIG. 8 illustrates one possible user interface display involving an example of the invention's selection process. In this example, the item at 810 ("certified copy") is selected (shown by cursor 520 pointing at item 810). Responsive to a command for replacement (the notation "click," 310) the invention replaces a first item (the word "print" at 410) with an item from the database, "certified copy" at 810. The notation "click," 310, signifies a user sending a command, by clicking a mouse button, or touching a touch-sensitive screen with a stylus, or using some other input device. On the other hand, a user could decide not to select any of the similar items at 710, but rather utilize button 450 as a way to exit the pop-up display.

Figure 9:
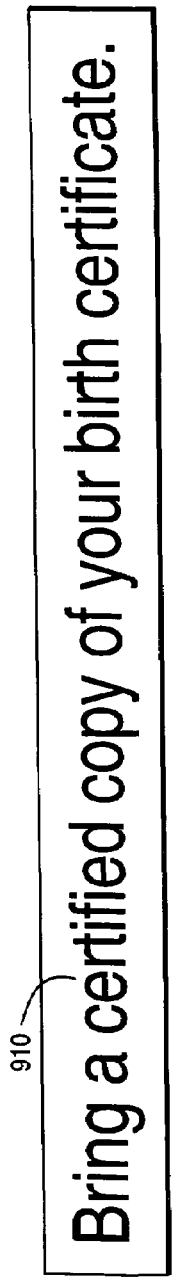
FIG. 9 illustrates one possible user interface display involving an example where an item from a database has been utilized in a main application such as a word processor, according to the teachings of the present invention.

The example in FIG. 9 shows the result after the invention replaces a first item (the word "print" at 210 in FIG. 2) with an item from the database, "certified copy" at 910. In this example, an item from the database has been utilized in a main application such as word processor. FIGS. 2-9 show how the invention allows a user to thoroughly search a database for items to utilize in a main application, while minimizing the diversion of a user's attention away from the main application.

Figure 10:
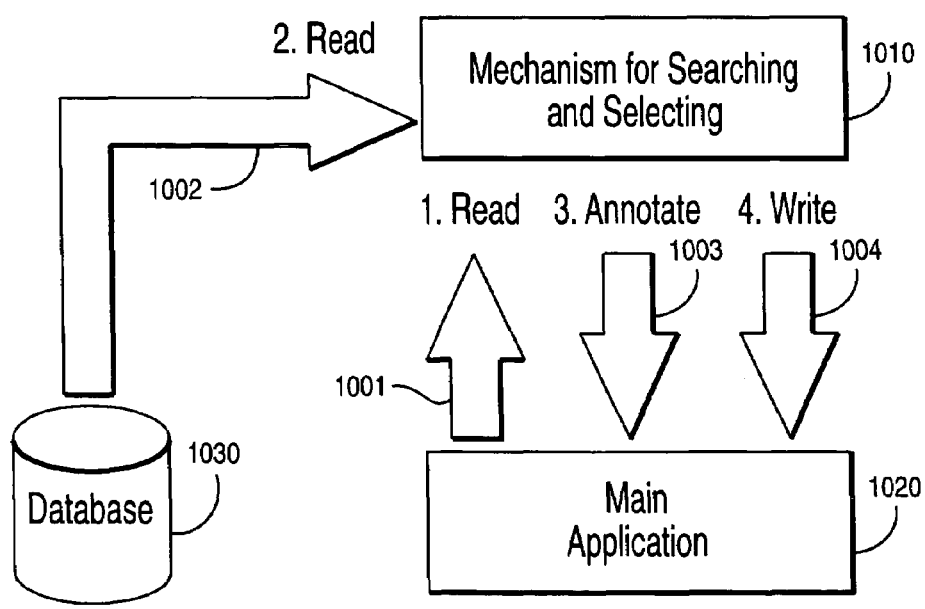
FIG. 10 is a high-level block diagram illustrating an example of a system and method for searching and selecting, according to the teachings of the present invention.

FIG. 10 is a high-level block diagram illustrating an example of a system and method for searching and selecting, according to the teachings of the present invention. Software for implementing the present invention is contained in a mechanism for searching and selecting, block 1010. Mechanism 1010 interacts with a main application, block 1020, and a database, 1030. Main application 1020 may be a word processor, text editor, graphics application, purchasing software, or some other application. Database 1030 may be a thesaurus or dictionary, or may contain descriptions of goods or components, or may contain images, for example. Database 1030 may be incorporated into mechanism 1010 or may be operated as a database system independent of, but accessible to, mechanism 1010. At 1001, mechanism 1010 reads a cursor's position from main application 1020, and responsive to the cursor's position, mechanism 1010 identifies a target item from main application 1020. At 1002, mechanism 1010 searches database 1030 for items similar to said target item and reads data from database 1030. At 1003, mechanism 1010 annotates the user interface of main application 1020, providing an indicator, near the target item's position, to show that similar items from database 1030 may be displayed. The indicator may show how many of said similar items exist in database 1030. Mechanism 1010 provides access to said similar items from database 1030. A user may select a similar item from database 1030 for use in main application 1020, so at 1004, mechanism 1010 writes data to main application 1020. For example, mechanism 1010 may replace a first item in main application 1020 with an item from database 1030, as illustrated in FIGS. 2-9.

Figure 11:
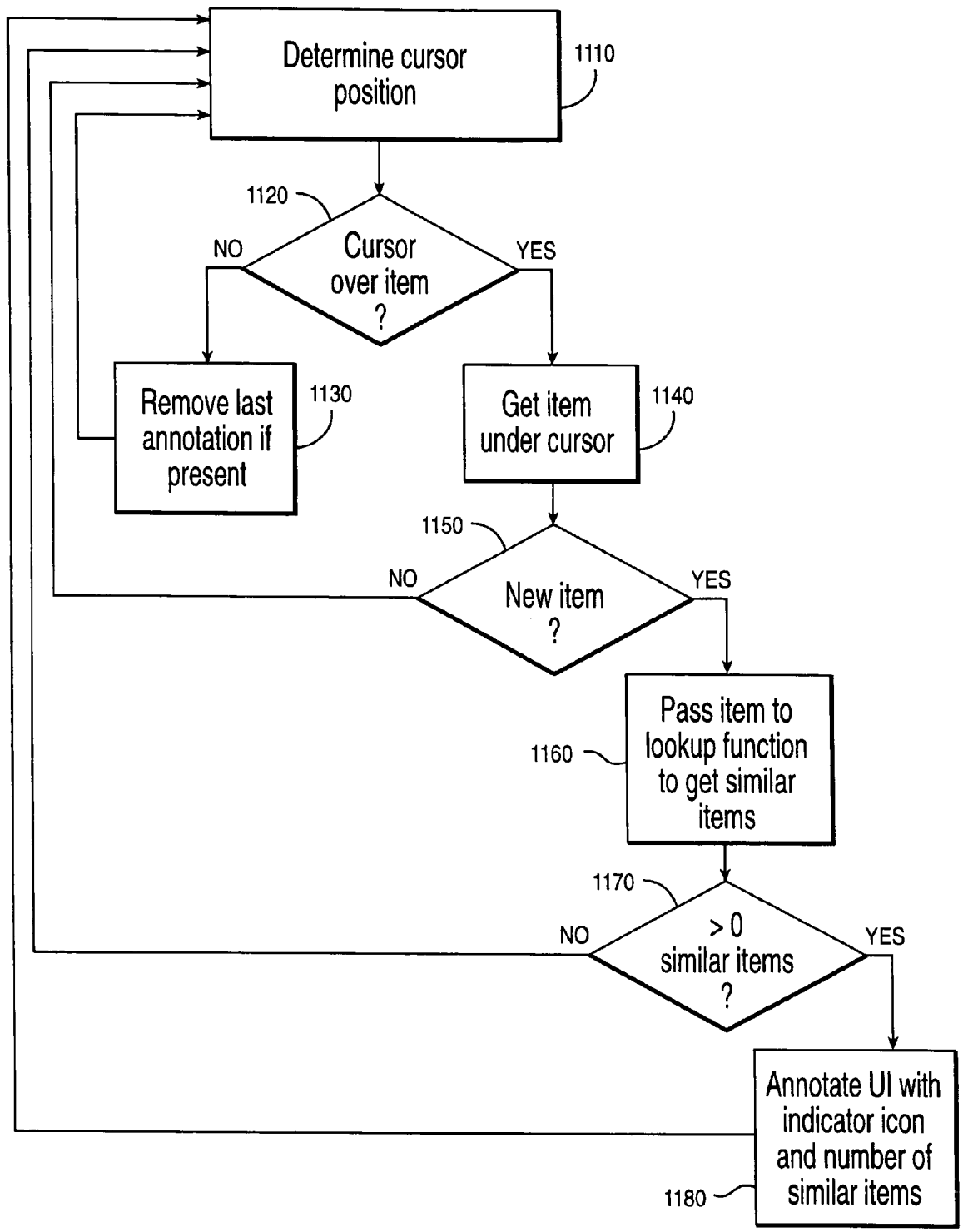
FIG. 11 is a flow chart illustrating an example of a recursive annotation function for annotating a user interface, according to the teachings of the present invention.

FIG. 11 is a flow chart illustrating an example of a recursive annotation function for annotating a user interface, according to the teachings of the present invention. At block 1110, the annotation function determines a cursor's position, in a user interface of a main application. If the cursor is not over an item that can trigger a search, the "No" branch is taken at decision 1120; for example, the cursor may be over a print button in a word processor application. Next, at block 1130, the last annotation provided by the annotation function is removed, if one is present, and the process returns to block 1110. On the other hand, if at decision 1120 the cursor is over an item that can trigger a search, the "Yes" branch is taken to block 1140. At block 1140, the annotation function gets the item under a cursor, in a user interface of a main application. If this item is not a new item (i.e., not an item different from the last one handled by the annotation function) the "No" branch is taken at decision 1150, and the process returns to block 1110. On the other hand, if at decision 1150 the item is a new item, the "Yes" branch is taken to block 1160. At block 1160 the annotation function passes the item to a lookup function (see FIG. 12) to get similar items from a database; the lookup function will return the number of similar items in the database. If the number of similar items in the database is zero, the "No" branch is taken at decision 1170, and the process returns to block 1110. On the other hand, if at decision 1170 the number of similar items in the database is greater than zero, the "Yes" branch is taken to block 1180. At block 1180, the annotation function annotates a user interface (UI) of a main application. Typically this will involve providing an indicator, near the target item's position, to show the existence of similar items in said database. The indicator may show how many similar items exist in said database. Annotating a UI also will involve providing, near the target item's position, an icon for sending a command for display of, or access to, the similar items. Typically this will involve calling a recursive pop-up display function (see FIG. 13). Typically this will initiate a sequence of function calls in which the recursive annotation function may be called again. Following block 1180, the annotation function returns to block 1110.

Figure 12:
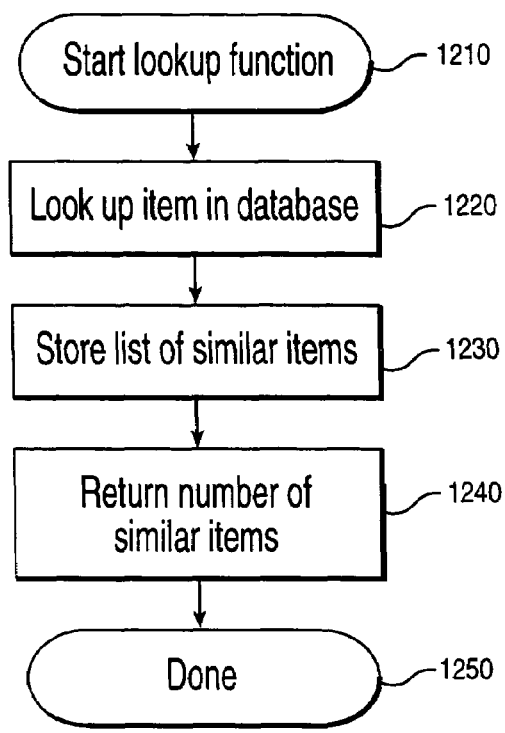
FIG. 12 is a flow chart illustrating an example of a lookup function, according to the teachings of the present invention.

FIG. 12 is a flow chart illustrating an example of a lookup function, according to the teachings of the present invention. The lookup function starts at block 1210. Typically this will involve the lookup function being called by the annotation function in FIG. 11. (In FIG. 11, block 1160, the annotation function passes an item to the lookup function to get similar items from a database.) At block 1220 the lookup function looks up this target item in the database. If there is at least one item similar to this target item in the database, the lookup function stores a list of similar items, at block 1230. At block 1240, the lookup function returns the number of similar items in the database; the process is now done, block 1250.

Figure 13:
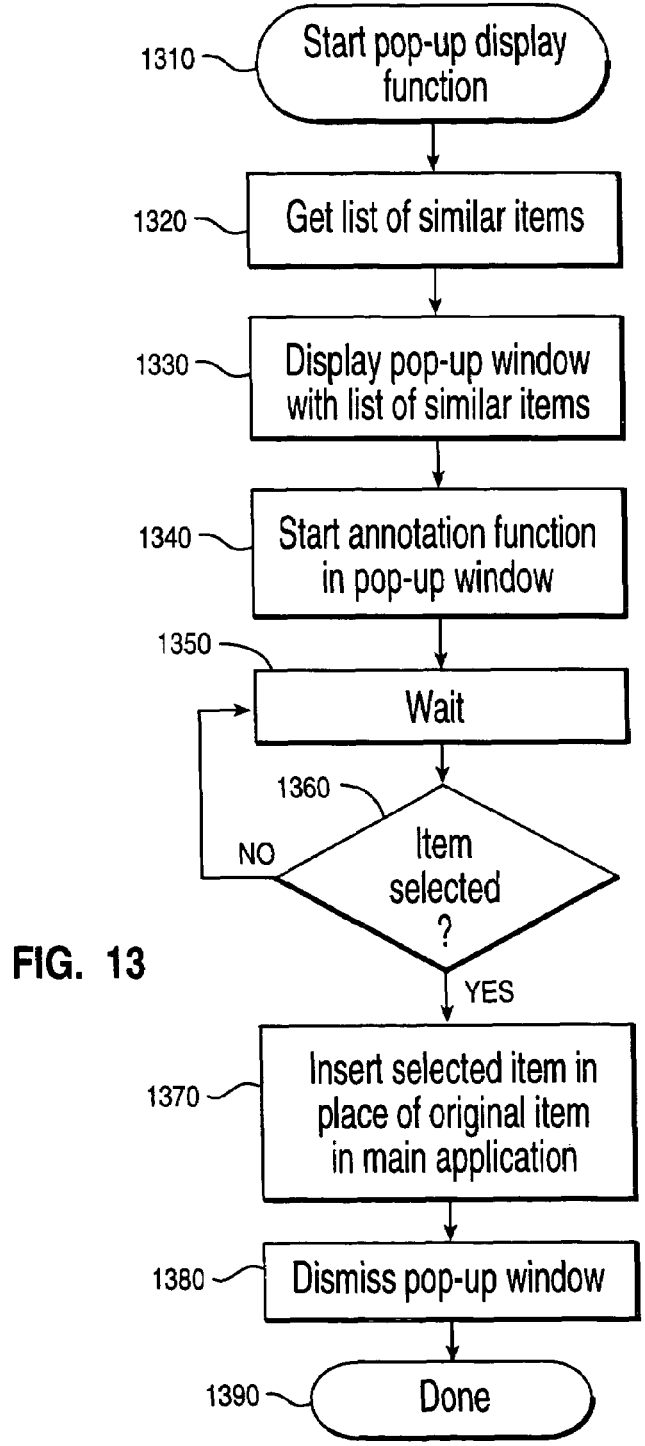
FIG. 13 is a flow chart illustrating an example of a recursive pop-up display function, according to the teachings of the present invention.

FIG. 13 is a flow chart illustrating an example of a recursive pop-up display function, according to the teachings of the present invention. The pop-up display function starts at block 1310. Typically this will involve the pop-up display function being called by the annotation function in FIG. 11 (see the description of FIG. 11, block 1180). At block 1320, the pop-up display function gets a list of items from a database, that are similar to a target item; this list of similar items may be generated by a lookup function such as the one in FIG. 12. At block 1330, this list of similar items is displayed in a pop-up window, near a target item's position in a user interface of a main application. At block 1340, an annotation function starts inside the pop-up window. Typically this will involve calling a recursive annotation function (see FIG. 11). Typically this will involve a sequence of function calls in which the recursive pop-up display function may be called again. At block 1350, the pop-up display function waits. At this point, a user may select a similar item from the database for use in the main application; if not, the "No" branch is taken at decision 1360, and the process continues waiting at block 1350. If a user selects a similar item from the database for use in the main application, the "Yes" branch is taken at decision 1360, and the process provides the similar item for use at block 1370. In this example, the selected item is inserted in place of an original item in a main application. This might involve inserting a word with a word processor, as in FIGS. 8-9. On the other hand, this might involve placing an order to buy an item with a purchasing application, or utilizing an image with a graphics application, for example. After dismissing the pop-up window at block 1380, the recursive pop-up display function terminates at block 1390.

Those skilled in the art will recognize that blocks could be added to the above-mentioned flow charts to describe window-managing details, or optional features, such as changing the appearance of a cursor to show the existence of similar items in a database, or providing an exit button as a way to exit the pop-up display. Blocks in the above-mentioned flow charts could be arranged in a somewhat different order, but still describe the invention.

Figure 14:
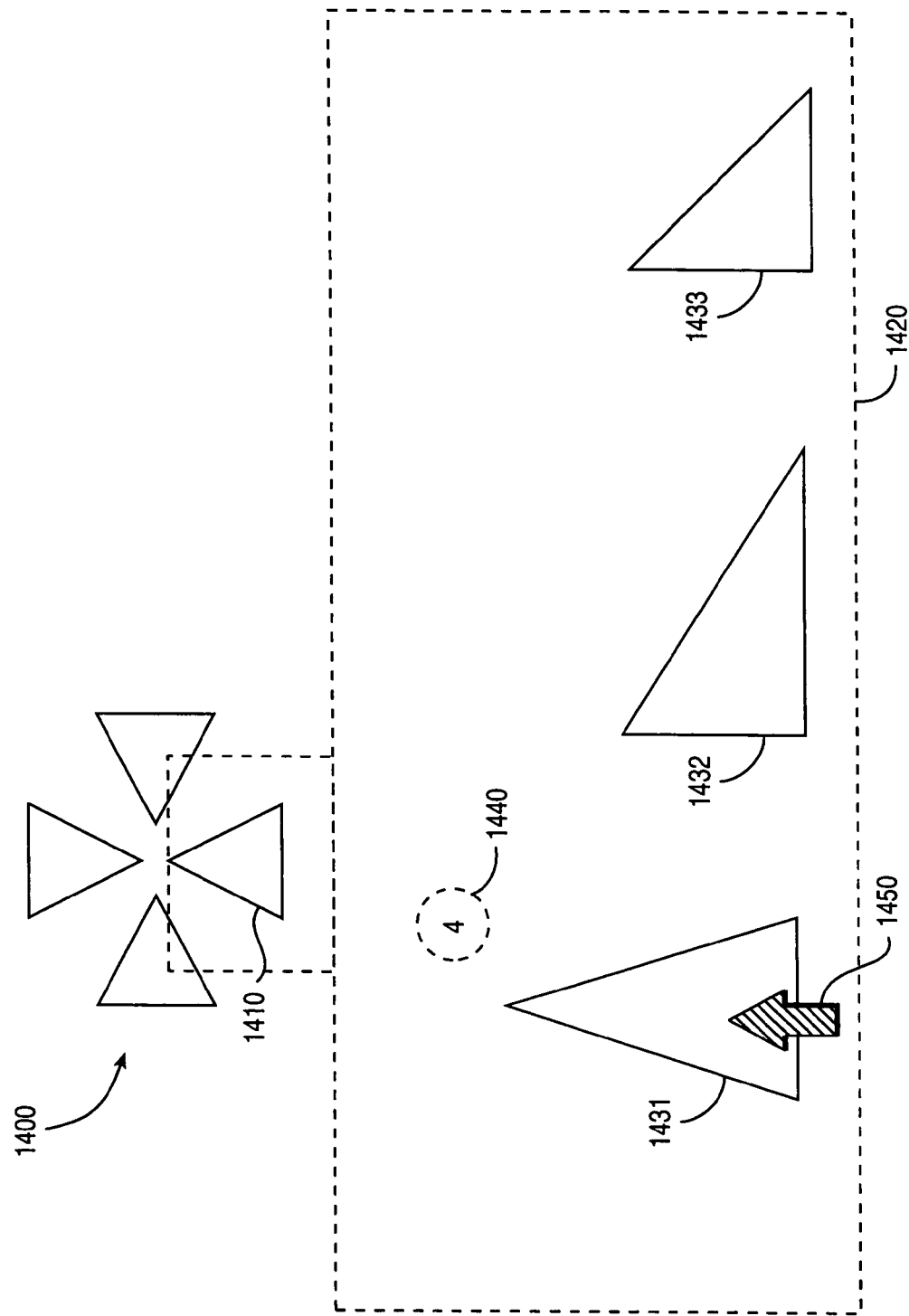
FIG. 14 illustrates one possible user interface display of a graphics application annotated with a pop-up display, according to the teachings of the present invention.

FIG. 14 illustrates one possible user interface display of a graphics application annotated with a pop-up display, according to the teachings of the present invention. This example may represent drawing software, drafting software or some other graphics software displaying images at 1400. The images in this example are triangular shapes that might represent shapes on a map, or structural components, or mechanical components such as fan blades. A first target item 1410 has been highlighted. A pop-up display, 1420, shows similar items, 1431, 1432, and 1433, and provides access to them. Any one of the similar items at 1431, 1432, and 1433 may become a target item for the invention's recursive search process (in particular, a recursive annotation function as in FIG. 11). In this example, responsive to cursor 1450's position, the item at 1431 has become a target item for the recursive annotation function. The invention searches a database for items similar to the target item. The invention provides an indicator, 1440, near item 1431's position, to show the existence of similar items in the database. In this example, indicator 1440 displays a number (4), showing how many similar items (i.e. items similar to the item at 1431) exist in said database. Similar items might be components of the same shape, with various dimensions or made of various materials, for example. The user may choose to see items similar to the item at 1431. On the other hand, the user may choose to utilize the item at 1431.

In conclusion, a system and method has been shown that allow a user to thoroughly search a database for items to utilize in a main application, while minimizing the diversion of a user's attention away from the main application.

One of the preferred implementations of the invention is an application, namely a set of instructions (program code) in a code module which may, for example, be resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A computer-implemented method of providing access to a database, said method comprising:
   providing a recursive search process that includes a-d below:
   a. responsive to a cursor's position, identifying a target item;
   b. searching a database for items similar to said target item;

c. providing an indicator, near said target item's position, to show the existence of similar items in said database; and
d. responsive to a command for access, providing access to said similar items;
applying, to a first item in a main application, said recursive search process, wherein any one of said similar items may become said target item for said recursive search process; and
responsive to a command for replacement, replacing said first item with an item from said database.

2. The computer-implemented method of claim 1, wherein:
said items are words; and
said database is a thesaurus.

3. The computer-implemented method of claim 1, wherein:
said items are words; and
said database is a dictionary.

4. The computer-implemented method of claim 1, wherein said items are non-textual graphical images.

5. The computer-implemented method of claim 1, wherein said indicator provides a display of a numerical total of a number of said similar items that exist in said database.

6. The computer-implemented method of claim 1, wherein said providing an indicator further comprises providing an icon for sending said command for access.

7. The computer-implemented method of claim 1, wherein said providing an indicator further comprises changing the appearance of said cursor.

8. The computer-implemented method of claim 1, further comprising:
dynamically analyzing a context in which said first item appears; and
based on said context, displaying said similar items so that the similar items displayed first are those most appropriate to replace said first item.

9. The computer-implemented method of claim 1, wherein the recursive search process including a-d is provided as a background application that is applied to the first item in the main application prior to a selection of the target item by a user via an input device.

10. The computer-implemented method of claim 1, wherein the indicator is a graphical indicator representative of similar items being present, but does not display any details of any of the similar items prior to selection of the indicator by a user via an input device.

11. A method of providing access to a database, said method comprising:
applying a recursive annotation function to a first item in a main application;
with said recursive annotation function,
responsive to a cursor's position, identifying a target item;
searching a database for items similar to said target item;
providing an indicator, near said target item's position, to show that similar items from said database may be displayed; and
providing, near said target item's position, an icon for sending a command for display to a recursive pop-up display function;
with said recursive pop-up display function,
responsive to said command for display, displaying said similar items in a pop-up window, near said target item's position;
applying said recursive annotation function to said similar items, wherein any one of said similar items may become said target item for said recursive annotation function; and
responsive to a command for replacement, replacing said first item with an item from said database.

12. The method of claim 11, wherein:
said items are words; and
said database is a thesaurus.

13. The method of claim 11, wherein:
said items are words; and
said database is a dictionary.

14. The method of claim 11, wherein said items are non-textual graphical images.

15. The method of claim 11, wherein said indicator provides a display of a numerical total of a number of said similar items that exist in said database.

16. The method of claim 11, wherein said providing an indicator further comprises changing the appearance of said cursor.

17. The method of claim 11, further comprising:
dynamically analyzing a context in which said first item appears; and
based on said context, displaying said similar items so that the similar items displayed first are those most appropriate to replace said first item.

18. A system for providing access to a database, said system comprising:
a processor;
a memory having instructions contained therein, wherein the instructions, when executed by the processor, provide:
recursive search means, including a-d below:
a. means for identifying a target item in response to a cursor's position;
b. means for searching a database for items similar to said target item;
c. means for providing an indicator, near said target item's position, to show the existence of similar items in said database; and
d. means to a command for providing access to said similar items in response to a command for access; and
means for replacing said first item with an item from said database in response to a command for replacement, wherein:
said recursive search means operates on a first item in a main application, and
any one of said similar items may become said target item for said recursive search means.

19. The system of claim 18, wherein:
said items are words; and
said database is a thesaurus.

20. The system of claim 18, wherein:
said items are words; and
said database is a dictionary.

21. The system of claim 18, wherein said items are non-textual graphical images.

22. The system of claim 18, wherein said indicator provides a display of a numerical total of a number of said similar items that exist in said database.

23. The system of claim 18, wherein said means for providing an indicator further comprises means for providing an icon for sending said command for access.

24. The system of claim 18, wherein said means for providing an indicator further comprises means for changing the appearance of said cursor.

25. The system of claim 18, further comprising:
means for dynamically analyzing a context in which said first item appears; and means for displaying said similar items, based on said context, so that the similar items displayed first are those most appropriate to replace said first item.

26. The system of claim 18, wherein the recursive search means including a-d is provided as a background application that is applied to the first item in the main application prior to a selection of the target item by a user via an input device.

27. The system of claim 18, wherein the indicator is a graphical indicator representative of similar items being present, but does not display any details of any of the similar items prior to selection of the indicator by a user via an input device.

28. A computer readable storage medium having computer-executable instructions for providing access to a database, said computer-executable instructions comprising:
  recursive search means, including a-d below:
   a. means for identifying a target item in response to a cursor's position;
   b. means for searching a database for items similar to said target item;
   c. means for providing an indicator, near said target item's position, to show the existence of similar items in said database; and
   d. means for providing access to said similar items in response to a command for access; and
  means for replacing said first item with an item from said database in response to a command for replacement, wherein:
  said recursive search means operates on a first item in a main application, and
  any one of said similar items may become said target item for said recursive search means.

29. The computer readable storage medium of claim 28, wherein:
  said items are words; and
  said database is a thesaurus.

30. The computer readable storage medium of claim 28, wherein:
  said items are words; and
  said database is a dictionary.

31. The computer readable storage medium of claim 28, wherein said items are non-textual graphical images.

32. The computer readable storage medium of claim 28, wherein said indicator provides a display of a numerical total of a number of said similar items that exist in said database.

33. The computer readable storage medium of claim 28, wherein said means for providing an indicator further comprises means for providing an icon for sending said command for access.

34. The computer readable storage medium of claim 28, wherein said means for providing an indicator further comprises means for changing the appearance of said cursor.

35. The computer readable storage medium of claim 28, further comprising:
  means for dynamically analyzing a context in which said first item appears; and
  means for displaying said similar items, based on said context, so that the similar items displayed first are those most appropriate to replace said first item.

36. The computer readable storage medium of claim 28, wherein the recursive search means including a-d is provided as a background application that is applied to the first item in the main application prior to a selection of the target item by a user via an input device.

37. The computer readable storage medium of claim 28, wherein the indicator is a graphical indicator representative of similar items being present, but does not display any details of any of the similar items prior to selection of the indicator by a user via an input device.

* * * * *